United States Patent [19]
Dorth et al.

[11] Patent Number: 6,044,543
[45] Date of Patent: Apr. 4, 2000

[54] METHOD OF MANUFACTURING A JOINT HOUSING

[75] Inventors: Harald Dorth, Düsseldorf; Horst Stelljes, Ratingen; Klaus Rosenberger, Krefeld, all of Germany

[73] Assignee: TRW Fahrwerksysteme GmbH & Co. KG, Dusseldorf, Germany

[21] Appl. No.: 08/836,364

[22] PCT Filed: Sep. 21, 1996

[86] PCT No.: PCT/EP96/04133

§ 371 Date: Jul. 15, 1997

§ 102(e) Date: Jul. 15, 1997

[87] PCT Pub. No.: WO97/12155

PCT Pub. Date: Apr. 3, 1997

[30] Foreign Application Priority Data

Sep. 28, 1995 [DE] Germany ............... 195 36 035

[51] Int. Cl.$^7$ ................................................. B23P 13/04
[52] U.S. Cl. ........................... 29/558; 29/557; 72/356
[58] Field of Search ...................... 29/558, 898.051, 29/898.048, 557, 441.1; 72/334, 356, 377; 403/76, 77, 122

[56] References Cited

U.S. PATENT DOCUMENTS

| | | | |
|---|---|---|---|
| 3,314,277 | 4/1967 | Hopkins et al. | 72/356 |
| 3,361,457 | 1/1968 | Aldinger | 403/122 |
| 3,897,616 | 8/1975 | Williams . | |
| 3,988,818 | 11/1976 | Allison | 29/898.051 |
| 4,087,188 | 5/1978 | McEowen | 403/122 |
| 4,202,082 | 5/1980 | Williams | 72/356 |
| 5,087,131 | 2/1992 | D'Andrea | 29/898.048 |
| 5,129,251 | 7/1992 | Takikawa . | |

FOREIGN PATENT DOCUMENTS

| | | |
|---|---|---|
| 0623408 | 11/1994 | European Pat. Off. . |
| 58-112626 | 7/1983 | Japan . |
| 59-010440 | 1/1984 | Japan . |
| 62-084848 | 4/1987 | Japan . |
| WO8603705 | 7/1986 | WIPO . |

OTHER PUBLICATIONS

*ISBN* 3–88355–213–5, 4 Pages, 1995 by DGN Informationsgesellschaft.mbH.
*DIN*8583, DK 621.735.043:621.983:001.4 Deutsche Normen, Mai 1970, 11 Pages.
Maschinenmarkt.Wurzburg 98 (1992) Grenzen uberwunden, 3 Pages.
Maschinenmarkt.Wurzburg 97(1991) Nabe einer Fahrzeug–Freilaufkupplung in sieben Arbeitsgangen kaltumformen, 4 Pages.
Drahtwelt 2—1976, pp. 67–70, *Kalt–und warmgepresste Formteile mit anschliebender spanender Nachbearbeitung (1).*
Maschinenmarkt.Wurzburg 99 (1993) 14, pp. 22–28, *Kosten senken.*
Werkstatt und Betrieb 126 (1993) 10, pp. 615–618, *Achszapfen durch Halbwarmfliesspressen kombiniert mit Kaltfliesspressen fertigen.*

Primary Examiner—David P. Bryant
Assistant Examiner—Jermie E. Cozart
Attorney, Agent, or Firm—Tarolli, Sundheim, Covell, Tummino & Szabo L.L.P.

[57] ABSTRACT

The invention concerns a method of manufacturing a joint housing, in particular for vehicle track rods, having an integral shaft with an internal thread designed to hold a longitudinal pin, the housing being produced from a blank with a ball-like enlargement at one end. In order to ensure low manufacturing costs and low consumption of energy and materials, a longitudinal cavity with a diameter exceeding that of the internal thread and a length exceeding that of the threaded section is first produced in the shaft of the blank by rearwards cup extrusion and the diameter of the threaded section subsequently reduced to that of the thread core while at the same time shaping the surface of the wall to give a flat key face, the overall process being a cold-forming one. Finally, both the external and internal features of the housing are produced by heading, cupping, punching and forming to size perpendicular to the longitudinal axis in the region of the enlargement.

6 Claims, 2 Drawing Sheets

METHOD OF MANUFACTURING A JOINT HOUSING

TECHNICAL FIELD

The invention involves a process for manufacturing a steering joint housing equipped with a molded-on shaft having internal threads to hold an axial journal, in particular for steering tie rods on motor vehicles, made out of a blank which is preferably manufactured from wire material and has a ball-shaped enlargement on one end.

BACKGROUND OF THE INVENTION

To manufacture steering joint housings intended for steering tie rods on motor vehicles, it is known in practice to manufacture a blank from wire material which has a ball-shaped enlargement on one end. After heating, this blank is forged into a steering joint housing with a molded-on shaft in several sequential steps. To complete the steering joint housing, it is necessary to expensively machine out the steering joint housing not only so that it can hold both a bearing shell, which supports the corresponding steering joint ball, and a cover enclosing the inside of the housing, but also so that an axial drilled hole provided with a long threaded section can be brought into it, for holding an axial journal, by which the steering joint housing is attached to the steering tie rod. Along with the heating and the sequential forging processes, the expensive machining both of the steering joint housing and especially of the molded-on shaft is time-intensive and costly.

The purpose of the invention is to create a process of the type named above for manufacturing a steering joint housing with a molded-on shaft, which is considerably more cost effective and especially requires less of an expenditure of energy and materials.

SUMMARY OF THE INVENTION

The purpose is achieved in that the invention uses a cold forming process for the entire manufacture, where first an axial recess having a diameter exceeding the diameter of the internal threads and a length exceeding the axial length of the threaded area is manufactured in the shaft of the blank using reverse cup extrusion, and then the threaded area only is reduced to the thread root diameter under simultaneous forming of the sheath surface into a key surface, and then both the outer contour and the inner contour of the steering joint housing are manufactured, by settling, cupping, drilling holes (and in the process, shearing off of the material waste) and calibrating done crosswise to the axle direction in the area of the enlargement.

By the process according to the invention, which occurs completely without heating, on the one hand, the time-intensive and costly manufacture of a long axial drilled hole and of a long threaded section in the shaft of the steering joint housing is avoided, since only the reduced thread root area, which has a short length, must be provided with internal threads because the axial recess manufactured by reverse cup extrusion in the first process step has a larger diameter than the root diameter, so that the recess connecting to the threaded area in the direction toward the steering joint housing can hold the axial journal used in the attachment of the steering joint housing to a steering tie rod. On the other hand, the machining down, required until now, of both the inner and the outer contour of the steering joint housing, becomes unnecessary due to the calibration of the steering joint housing, so that on the whole, a considerably smaller manufacturing expense results by the process according to the invention. This is accompanied at the same time by reduced costs and shortened manufacturing time. In contrast to the forging operations required up to now, the process according to the invention can be automated so that the costs for the manufacture of steering joint housings provided with a molded-on shaft can be reduced considerably. In addition to cutting threads at considerably reduced lengths, it is merely necessary, in the process according to the invention, to turn a snap ring groove for the attachment of a bellows-type seal, if necessary, or, in the area of later housing covers, to turn a ring-shaped projection which holds the housing cover by caulking.

Provided that the steering joint housing is not arranged symmetrically to the shaft, then according to a further characteristic of the invention, the steering joint housing can be bent at a right angle sideways from the axle direction by cold forming. Furthermore, it is possible according to the invention to machine down the steering joint housing to preferably remove excess material in the area of the support for a cover that encloses the housing.

As already mentioned above, the thread root diameter manufactured by reducing is alone provided with inner threads in the process according to the invention. Finally, it is possible, according to the invention, to manufacture the entire length of the steering joint housing, provided with the molded-on shaft, exactly with the desired dimension by facing the end of the shaft.

DESCRIPTION OF A PREFERRED EMBODIMENT

Figure 1:
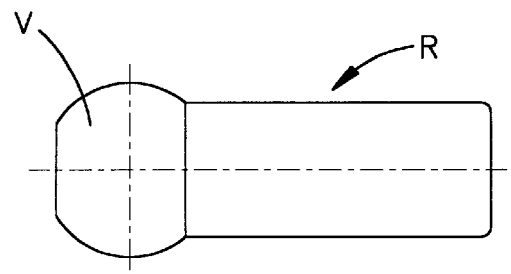

An embodiment example of the process according to the invention is depicted in the drawing by FIGS. 1–11 with individual process steps.

FIG. 1 shows the side view of a blank R manufactured by upsetting from wire material, provided with a ball-shaped enlargement V on one end.

Figure 2:
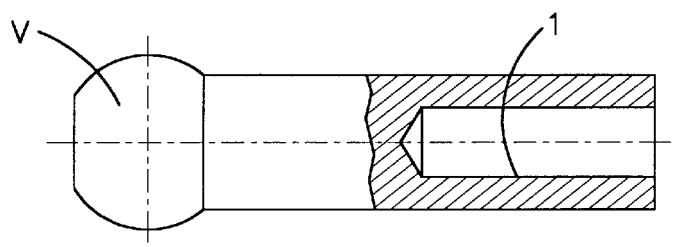

This blank R is provided with an axial recess 1 in a first process step according to FIG. 2 by reverse cup extrusion occurring in the cold state. The diameter of this axial recess 1 exceeds the diameter of the inner threading, which later functions for holding an axial journal by which the steering joint housing is connected to a steering tie rod via its molded-on shaft. Also, the axial length of the recess 1 is larger than the length of the inner threading to be manufactured later.

Figure 3:
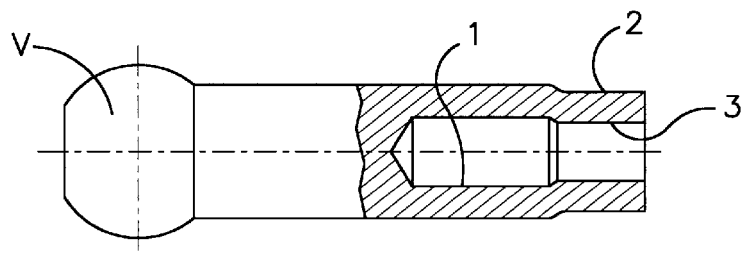

According to FIG. 3, the threaded area of the shaft is then manufactured, in that, on the one hand, the end of the shaft is reduced on its sheath surface to a key surface 2 and, on the other hand, the diameter of the axial recess 1 in this area is reduced to the thread root diameter 3. Thus, the cold formings of the blank R are completed in the later shaft area.

Figure 4:
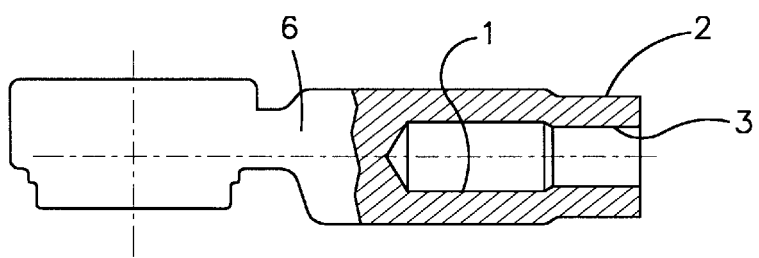
Figure 5:
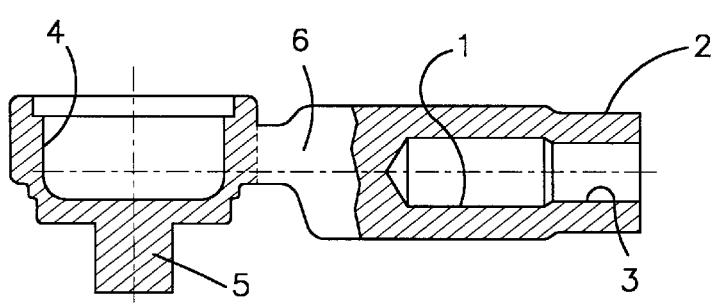

For the manufacture of the steering joint housing, the blank R is now upset in one or several process steps in the area of its ball-shaped enlargement V crosswise to the axial direction of the blank R, in order to obtain the form shown in FIG. 4. By cupping, the cross-sectional contour shown in FIG. 5, which is provided with a graduated crosswise recess 4 and waste material 5 in the embodiment example shown, then results for the later steering joint housing. FIGS. 4 and 5 show further a neck section 6 between the later steering joint housing and the molded-on shaft.

Figure 6:
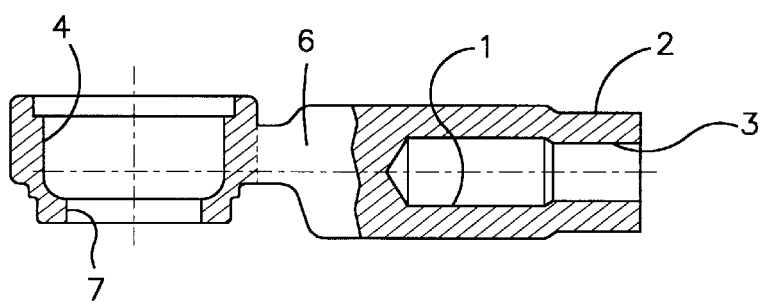

According to FIG. 6, a hole is now drilled in the steering joint housing such that at the same time the waste material 5 is sheared off. The through hole 7 resulting from this can be clearly seen in FIG. 6.

Figure 7:
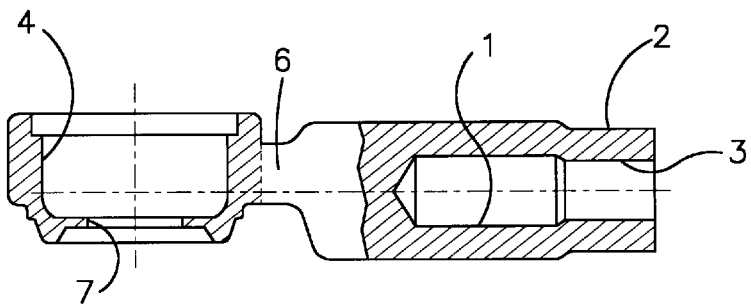
Figure 8:
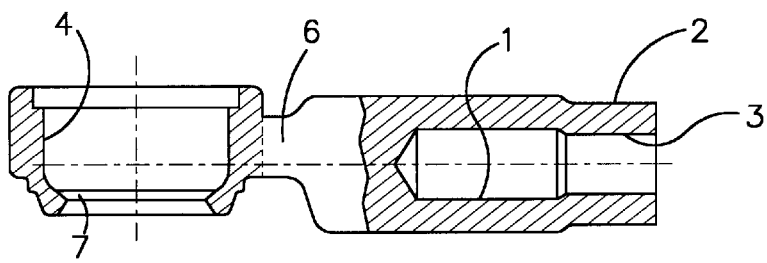

In the embodiment example, a calibration of the outer and inner contour of the steering joint housing is now done in two steps according to FIGS. 7 and 8. While a sharp-edged transition between the crosswise recess 4 and through hole 7 results by the first step of the calibration operation according to FIG. 7, the second calibration operation according to FIG. 8 causes the final contour of the steering joint housing, also in the area of the through hole 7.

Figure 9:
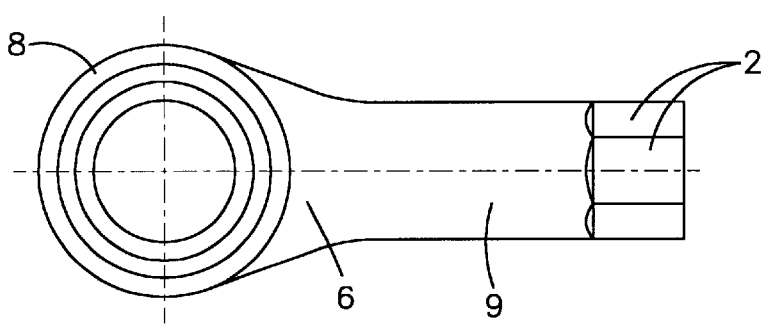
Figure 10:
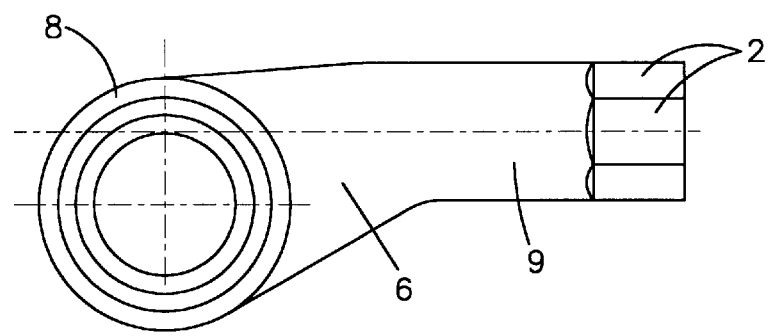

As shown in the overhead view in FIG. 9, the final steering joint housing 8 lies in the center on the longitudinal axle of the journal 9, whose key surface 2 is clearly recognized in the overhead view according to FIG. 9. Provided that an arrangement of the steering joint housing 8 bent at a right angle to the shaft 9 is desired, then the steering joint housing 8 is then bent at a right angle relative to the shaft 9 so that an embodiment form according to FIG. 10 results.

Figure 11:
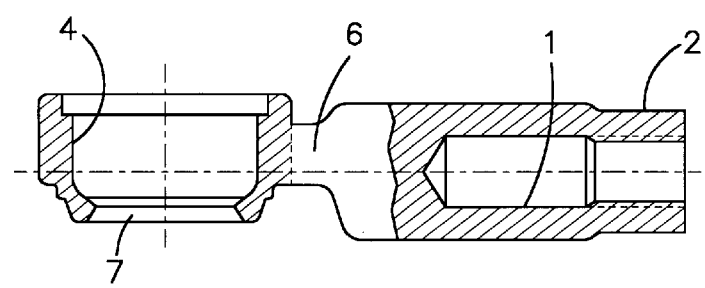

To complete manufacturing of the product, it is only required according to FIG. 11 to cut internal threads into the shaft 9 in the area of the thread root diameter 3 and by machining down in the area of the steering joint housing 8, to create the correct support for a cover enclosing the steering joint housing. A lengthwise section through the final product is shown in FIG. 11.

REFERENCE INDICATOR LIST

R Blank
V Enlargement
1 Axial recess
2 Key surface
3 Thread root diameter
4 Crosswise recess
5 Waste material
6 Neck section
7 Through hole
8 Steering joint housing
9 Shaft

We claim:

1. A method for manufacturing a steering joint housing (8) for a steering tie rod in a motor vehicle, the steering joint housing having a molded-on shaft (9) with an internally threaded section (3) for engaging with a threaded stem on the steering tie rod, said method comprising the steps of:

providing a wire material;

manufacturing the wire material into a blank (R) having a shaft portion and a ball-shaped enlargement (V) at one end;

reverse cup extruding an axial recess (1) into the shaft portion in a cold state, the axial recess being centered on an axis and having a first inside diameter and a first length;

reducing the inside diameter of a section (3) of the axial recess in the shaft portion by cold forming to a second inside diameter which is less than the first inside diameter, the second inside diameter corresponding to a root diameter of the internally threaded section of the molded-on shaft, the section of the axial recess which is cold formed being disposed at an end of the steering joint housing opposite the ball-shaped enlargement and having a second length which is less than the first length of the axial recess;

cupping the ball-shaped enlargement to produce a graduated crosswise recess (4) which extends transverse to the axis of the axial recess, the cupping leaving a waste material portion (5) opposite an open end of the crosswise recess;

drilling a hole (7) through the crosswise recess in the ball-shaped enlargement and thereby removing the waste material portion;

final machining an inner contour in the crosswise recess; and cutting internal threads into the internally threaded section of the axial recess in the shaft portion having the smaller second inside diameter, the internal threads for mating with the threaded stem on the steering tie rod.

2. The method for manufacturing a steering joint housing (8) of claim 1 further comprising the step of bending the ball-shaped enlargement at an angle relative to the axis of the axial recess.

3. The method for manufacturing a steering joint housing (8) of claim 1 further comprising the step of machining an outer contour of the ball-shaped enlargement to provide a cover for enclosing the crosswise recess.

4. A method for manufacturing a steering joint housing (8) for a steering tie rod in a motor vehicle, the steering joint housing having a molded-on shaft (9) with an internally threaded region for engaging with a threaded stem on the steering tie rod, said method comprising the steps of:

providing a wire material;

manufacturing the wire material into a blank (R) having a shaft portion and a ball-shaped enlargement (V) at one end;

reverse cup extruding an axial recess (1) into the shaft portion in a cold state, the axial recess being centered on an axis and having a first inside diameter and a first length, with the first inside diameter being larger than the inside diameter of the internally threaded region and with the first length being greater than the axial length of the internally threaded region;

reducing the inside diameter of only the internally threaded region of the shaft portion by cold forming to a second inside diameter and which matches the root diameter of the internally threaded region, the section of the shaft portion which is cold formed being disposed at an end of the steering joint housing opposite the ball-shaped enlargement and having a second length which is less than the first length;

cupping the ball-shaped enlargement to produce a graduated crosswise recess (4) which extends transverse to the axis of the axial recess, the cupping leaving a waste material portion (5) opposite an open end of the crosswise recess;

drilling a hole (7) through the crosswise recess in the ball-shaped enlargement and thereby removing the waste material portion;

final machining an inner contour in the crosswise recess; and cutting internal threads into the section of the shaft portion having the smaller second inside diameter, the internal threads for mating with the threaded stem on the steering tie rod.

5. The method for manufacturing a steering joint housing (8) of claim 4 further comprising the step of bending the ball-shaped enlargement at an angle relative to the axis of the axial recess.

6. The method for manufacturing a steering joint housing (8) of claim 4 further comprising the step of machining an outer contour of the ball-shaped enlargement to provide a cover for enclosing the crosswise recess.

* * * * *